Figure 1:
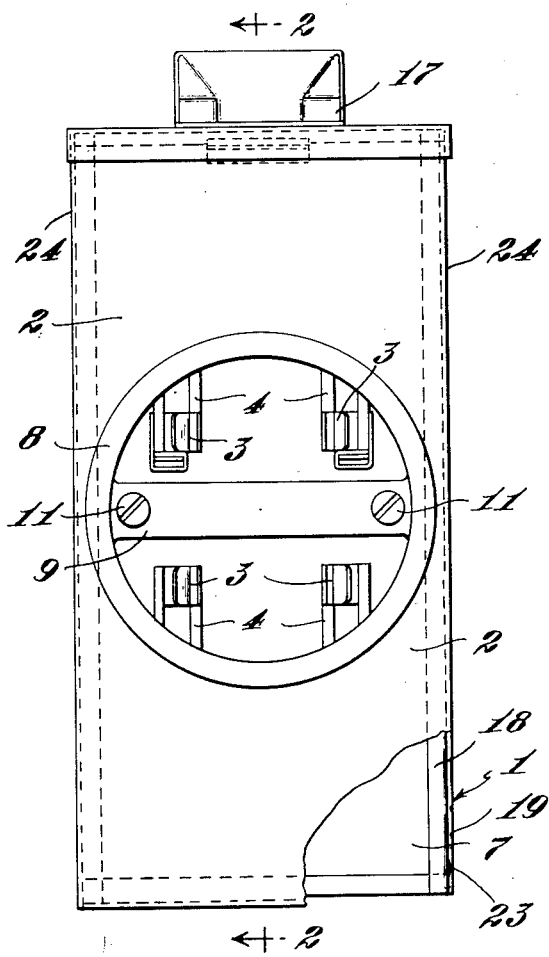

Sept. 1, 1953  E. G. JOHANSSON  2,651,008
METER BOX AND COVER
Filed Sept. 27, 1950

Inventor
Ernest G. Johansson
by Roberts, Cushman & Grover
Att'ys

Patented Sept. 1, 1953

2,651,008

UNITED STATES PATENT OFFICE 2,651,008

METER BOX AND COVER

Ernest G. Johansson, Belmont, Mass., assignor to Anchor Manufacturing Company, Boston, Mass., a corporation of Massachusetts Application September 27, 1950, Serial No. 187,001

2 Claims. (Cl. 317—105)

This invention relates to an improved box for mounting a meter, and particularly to a box having a cover with a socket for receiving a watthour meter and jaw terminals receiving contact blades attached to the base of the meter.

In the usual construction the cover is fastened to the box by screws with the jaws of the jaw terminals mounted therein extending into the socket of the meter cover to facilitate insertion of the meter contact blades as the meter is mounted in the socket. When the meter box is installed or serviced at the premises consuming metered power, access to the jaws and their associated terminals is had by removing the fastening screws and the cover. After the fastening screws are removed the cover is free, unless otherwise restrained, to slide edgewise and make contact with one or more of the jaws thus causing a dangerous short circuit or grounded circuit through the cover. The danger to property or person is especially great when high power is delivered to the meter box.

One object of the present invention is to provide a meter box and cover construction which guards against the danger of the cover coming into contact with the jaw terminals in the meter box. Another object is to provide a weatherproof connection between the box and the cover which affords such a safeguard and at the same time allows a ventilating air current to pass through the connection. A still further object is to provide a simplified construction which is economical to manufacture and convenient to install.

In one aspect the invention comprises a meter-mounting box having a back and side walls and jaw terminals mounted therein, a cover for the box having a socket therethrough into which the jaws of said terminals extend, one wall of the box, preferably the upper end wall, having a flange extending at an angle therefrom and a lip extending from the flange rearwardly toward the back of the box, and at the corresponding end of the cover a flange extending outwardly away from the back and adapted to lie between the aforesaid lip and end wall when the cover bears on the edges of other side walls, the cover flange being designed to engage the lip preventing the cover from sliding edgewise into contact with the jaws, but permitting the cover to be removed when it is swung at an angle to the box at which the cover flange is disengaged from the lip and the cover is clear of the terminal.

In another aspect the upper edge of the cover is disposed to engage the edges of the side walls and afford a pivot located between the aforesaid socket and cover flange about which the cover may be swung to disengage the cover flange from the lip.

In a further aspect the box flange encloses the upper end of the cover so as to provide a weatherproof connection between the cover and box, and the box is provided with means for attaching the cover thereto and positioning the cover so as to space the cover flange from the box flange and afford an air passage therebetween.

In a still further aspect the side walls of the box are deeper than the lower end wall so that when the cover is attached to the box in abutment with the side walls, an air passage is provided between the cover and the edge of the lower end wall.

Figure 2:
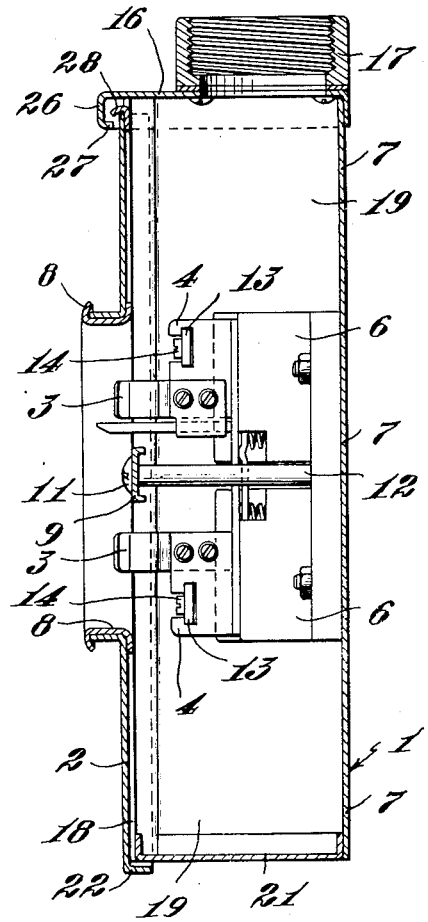
Figure 3:
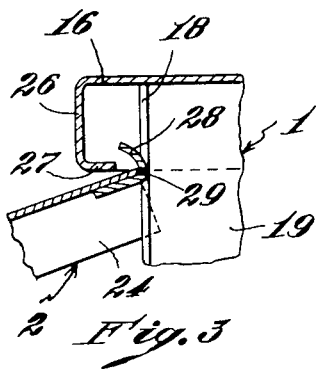
Figure 4:
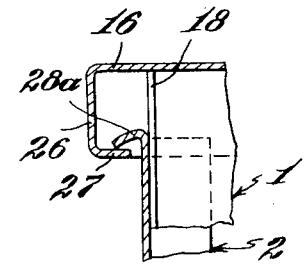
Figure 5:
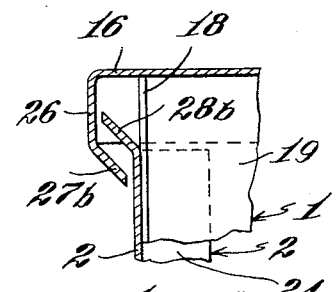

For the purpose of illustration typical embodiments of the invention are shown in the accompanying drawing in which:

Fig. 1 is a front elevation of the meter box;
Fig. 2 is a section on lines 2—2 of Fig. 1;
Fig. 3 is an enlarged sectional elevation; and
Figs. 4 and 5 are enlarged sectional elevations like Fig. 3, showing modifications.

One embodiment of the invention chosen for the purpose of illustration as shown in Figs. 1 to 3 comprises a meter box, indicated generally by the numeral 1, and a cover 2. Within the box 1 are four jaws 3 and their associated terminals 4 mounted on insulating blocks secured to the back 7 of the box. The cover 2 has an annular flange 8 providing a socket through which the contact blades of a watt-hour meter, such as the American Standard type S, may be inserted into engagement with the jaws 3. Extending diametrically across the annular flange 8 is a cross bar 9 having holes through which screws 11 may be passed for fastening the cross bar to mounting posts 12. Associated with each terminal 4 is a clamping block 13 and screw 14 for securing wires to the terminals. At the upper wall 16 is a stuffing tube 17 providing a weatherproof entrance for the wires to the terminals.

When the cross bar 9 is secured to the posts 12 the cover 2 is held against flanges 18 at the forward edges of side walls 19. As shown in Fig. 2 the flanges 18 extend from the back wall 7 further than the end wall 21 and a flange 22 at the lower end of the cover 2 is spaced from the lower end wall 21, thus providing an air passage between the lower end of the cover and the lower end wall 21. The flanges 18 at the edges of the side walls 19 have shoulders 23 over which flanges 24 at the sides of the cover telescope.

The upper end of the cover extends under a flange 26 disposed downwardly from the upper end wall 16 so as to prevent rain from entering at the top of the cover. The flange 26 has an inturned lip 27 directed toward the back wall 7. Attached to the upper edge of the cover is an outwardly directed flange 28 which, when the cover abuts the side walls 19, is disposed between the lip 27 and the end wall 16, as shown in Fig. 2. When the cover is attached to the mounting post 12 by the screws 11 the cover flange 28 is spaced from the lip 27 and the box flange 26 so as to form an air passage from within the box, past the flanges 28 and 26 to the exterior. The air passages at the top and bottom edges of the cover provide a path for a convection current to carry off heat generated by heavy current through the terminals 4.

If the fastening screws 11 are removed the cover flange 28 (28a in Fig. 4) engages the lip 27 and supports the cover 2 so that the flange 8 cannot slide downward into contact with the jaws 3. Thus whether the meter box is mounted in an upright position as shown in the figures, or on its back or sides, a serviceman may not remove the cover without swinging the cover at an angle to the box as shown in Fig. 3. In swinging the cover away from the box the end edges of the cover pivot against the flanges 18 of the side walls 19 about a point 29. The flange 28 and lip 29 are so designed that the cover must be swung about the pivot point 29 to an angle sufficient to clear the socket and the adjacent portion of the cover from the terminals. Only at this or a greater angle may the cover flange 28 be withdrawn from between the lip 27 and the upper end wall 16, to allow removal of the cover. According to the modified forms of the cover and box connection as shown in Figs. 4 and 5 a cover flange 28a or 28b may be formed integrally with the cover 2. As shown in Fig. 5 a lip 27b may be inclined at an angle to the box flange 26, and the cover flange 28b may be disposed at an angle to the cover 2. Whichever of the forms illustrated in Figs. 3 to 5 are used the cover flange will prevent removal of the cover from the box unless the cover is swung to a safe angle.

It should be understood that the present disclosure is for the purpose of illustration only and that this invention includes all modifications and equivalents which fall within the scope of the appended claims.

I claim:

1. A meter mounting box having a back, upper and side walls, a cover for the box having means forming an opening for a meter therethrough, said box and cover being designed to enclose a jaw terminal extending into said opening, extending downwardly from said upper wall a flange having a lip directed rearwardly toward said back wall, at one edge of the cover a forwardly extending flange disposed to lie between said upper wall and lip when the cover abuts the edges of the side walls, said side walls normally abutting said cover and the box lip extending inwardly so as to obstruct downward movement of the cover flange so that the cover flange only supports the cover in a temporary position generally parallel with said side wall edges and with said opening means out of engagement with said terminal, the cover flange and box lip engaging with a line contact providing a pivot for swinging the cover to a position where said opening means clears said terminal and said flange is unobstructed to permit removal of the cover from the box, means forming an air passage at the bottom of the box, said box flange and lip being arranged to allow unobstructed movement of the cover from said temporary position to a fixed position in which the cover flange is spaced from the box flange and lip to afford a second cooperating air passage between the flanges, and mounting means for holding the cover in said fixed position.

2. A meter mounting box having a back, upper, lower and side walls, a cover for the box having means forming an opening for a meter therethrough, said box and cover being designed to enclose a jaw terminal with the terminal extending into said opening, extending downwardly from the upper wall a flange having a lip directed rearwardly toward said back wall, at one edge of the cover a forwardly extending flange disposed to lie between said upper wall and lip when the cover abuts the edges of the side walls, said side walls normally abutting said cover and the box lip extending inwardly so as to obstruct downward movement of the cover flange so that the cover flange only supports the cover in a temporary position generally parallel with said side wall edges and with said opening means out of engagement with said terminal, the cover flange and box lip engaging with a line contact providing a pivot for swinging the cover to a position where said opening means clears said terminal and said flange is unobstructed to permit removal of the cover from the box, said side walls extending outwardly from the back more than said lower end wall to afford an air passage between the edge of the lower wall and said cover, said box flange and lip being arranged to allow unobstructed movement of the cover from said temporary position to a fixed position in which the cover flange is spaced from the box flange and lip to afford a second cooperating air passage between the flanges, whereby a convection current may flow through the meter box in and out of said air passages, while affording a substantially weatherproof box, and mounting means for holding the cover in said fixed position.

ERNEST G. JOHANSSON.

References Cited in the file of this patent

UNITED STATES PATENTS

| Number | Name | Date |
|---|---|---|
| 1,916,219 | Hush | July 4, 1933 |
| 2,297,833 | Johansson | Oct. 6, 1942 |
| 2,329,349 | Johansson | Sept. 14, 1943 |
| 2,429,093 | Johansson | Oct. 14, 1947 |
| 2,515,576 | Viggiano | July 18, 1950 |